(12) United States Patent
Iwashita et al.

(10) Patent No.: US 6,482,526 B2
(45) Date of Patent: *Nov. 19, 2002

(54) METALLIC SHEET COVERED WITH POLYESTER RESIN FILM AND HAVING HIGH WORKABILITY, AND METHOD OF MANUFACTURING SAME

(75) Inventors: Hiroyuki Iwashita; Fumiko Gotoh; Atsuo Tanaka, all of Yamaguchi-ken (JP)

(73) Assignee: Toyo Kohan Co., LTD, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/171,122

(22) PCT Filed: Apr. 10, 1997

(86) PCT No.: PCT/JP97/01242

§ 371 (c)(1),
(2), (4) Date: Jul. 15, 1999

(87) PCT Pub. No.: WO97/37846

PCT Pub. Date: Oct. 16, 1997

(65) Prior Publication Data

US 2001/0055690 A1 Dec. 27, 2001

(30) Foreign Application Priority Data

Apr. 10, 1996 (JP) .............................. 8-112127

(51) Int. Cl.[7] .................. B32B 15/08; B32B 27/36; B32B 31/08; B32B 31/20
(52) U.S. Cl. .................. 428/458; 428/480; 428/910; 156/308.2; 156/309.6; 156/309.9; 156/321; 156/322

(58) Field of Search .................. 428/458, 480, 428/910; 156/321, 322, 308.2, 309.6, 309.9

(56) References Cited

U.S. PATENT DOCUMENTS 2,861,022 A * 11/1958 Lundsager .................. 428/458

FOREIGN PATENT DOCUMENTS

| JP | 01-180336 | 8/1989 |
| JP | 01-249331 | 10/1989 |
| JP | 02-070430 | 3/1990 |
| JP | 02-155642 | 6/1990 |

* cited by examiner

Primary Examiner—Paul Thiobodeau
Assistant Examiner—Ramsey Zacharia
(74) Attorney, Agent, or Firm—Browdy and Neimark, PLLC

(57) ABSTRACT

The present invention relates to a polyester resin-covered metal sheet exhibiting superior formability and particularly suitable to withstand the stresses of drawing, drawing and ironing, drawing and stretch forming, or drawing and stretch forming followed by ironing. The resin-covered metal sheet is produced by contacting a biaxially oriented polyester resin film to a metal sheet heated above the melting temperature of the resin, covering the metal sheet with the polyester resin, pinching and press laminating the film-metal sheet composite, and cooling the laminate at a rate of 600° C./second immediately thereafter. It is essential that the resulting resin-covered metal sheets exhibit a true stress of 3.0 to 15.0 kg/mm$^2$, corresponding to a true strain of 1.0 at 75° C. These laminates also exhibits a gradation of retention of the polyester resin's original biaxial orientation. Portions of the resin farthest from the metal sheet retain the greatest degree of their original orientation, the resin structure becoming increasingly amorphous nearer the underlying metal sheet.

9 Claims, No Drawings

METALLIC SHEET COVERED WITH POLYESTER RESIN FILM AND HAVING HIGH WORKABILITY, AND METHOD OF MANUFACTURING SAME

FIELD OF THE INVENTION

The present invention relates to a polyester resin-covered metal sheet possessing excellent formability. The covered sheet is particularly suited for "heavily formed" use, such as drawing, drawing and ironing, drawing and stretch forming, and ironing after drawing and stretch forming. The present invention also teaches a method for forming said resin-covered metal sheet.

BACKGROUND OF THE INVENTION

Metal containers such as beverage cans or battery containers are typically formed by drawing, drawing and ironing, drawing and stretch forming, or ironing after drawing and stretch forming. These drawing processes expand the interior volume of the metal container by reducing the thickness of the surrounding walls. Subsequent to drawing, the containers are usually laminated with a corrosion resistant coating and printed with desired text and indicia.

This process may be enhanced by first coating the metal sheets with an organic resin, such as polyethylene terephthalate (PET). Initial coating of the subsequently-drawn metal reduces coating costs and mitigates environmental pollution resulting from dispersion of solvents during the application of corrosion resistant coatings. Such resin-coated metal cans have already been utilized in beverage cans.

Suitable organic resins, in the form of a biaxially-oriented film, are heat-bonded to metal sheets prior to the drawing process. These films are manufactured via biaxial elongation of a thermoplastic polyester resin, followed by heat-setting. Their mechanical characteristics, when measured with a tensile tester, are characterized by large yield strength and small elongation (elongation after fracture).

Alternatively, the resin films may be laminated onto a metal sheet with adhesive, so as to avoid the loss of biaxial orientation that results from heat-bonding. However, due to their limited ability to elongate, these resin coatings exhibit numerous fractures and cracks. Furthermore, where there is only limited adhesion between the metal and the resin, the resin tends to peel off during the lamination process. Furthermore, where heat bonding is utilized to laminate the polyester resin onto the metal sheet, the biaxial orientation of the resin film is partially or entirely lost. Consequently, the yield strength of the post-lamination resin film decreases while elongation improves, preventing the film from cracking, peeling-off, or fracturing. Conversely, resin films lacking biaxial orientation have such large permeability that the contents of a container laminated therewith permeate the film and corrode the metal substratum. Such films also tend to generate coarse spherlites during the printing process, and tend to crack readily if containers collide or fall.

In biaxially oriented polyester resin films heat bonded to metal sheets, the elongation after fracture, prior to lamination, is defined in one of the following ways:
1. According to the preferable range described in Laid open Japanese patent Hei 1-249331,
2. As the range of the orientation coefficient showing the degree of biaxial orientation prior to lamination,
3. As the preferable range of elongation after the fracture and tensile strength are defined, as illustrated in Laid open Japanese patent Hei 2-70430.

Processes like those disclosed in Laid open Japanese patents Hei 1-249331 and Hei 2-70430, which utilize heat bonding to laminate a biaxially oriented resin film onto a metal sheet, effectively destroy the resin's biaxial orientation. This alters the values of the post-fracture elongation and the tensile strength. Thus, previously acceptable, biaxially oriented films, subsequent to heat lamination, may no longer exhibit the same favorable biaxial orientation; the film's favorable elongation and tensile strength will also be compromised.

OBJECT OF THE INVENTION

It is an object of the present invention to overcome the deficiencies in the prior art. Accordingly, the present invention produces a polyester resin film-covered metal sheet The values of the elongation after fracture (disclosed in Laid open Japanese patent Hei 1-249331) and elongation after fracture and disclosure of tensile strength (Laid open Japanese patent Hei 2-70430) are determined prior to lamination of the resin to the metal sheet. characterized by excellent formability and adapted for use in conventional drawing, drawing and ironing, drawing and stretch forming, and ironing after drawing and stretch forming processes.

SUMMARY OF THE INVENTION

According to the present invention, a polyester resin film-covered metal sheet, which retains the biaxial orientation of the resin subsequent to lamination, has a true stress value ranging from 3.0 to 15.0 kg/mm$^2$ measured at 75° C. and corresponding to a true strain of 1.0. In a preferred embodiment, the polyester resin is a polyethylene terephthalate resin having a low crystallization temperature, (i.e., the temperature of the exothermic peak produced upon heating a quenched sample of the resin in a differential scanning calorimeter) between 130 and 165° C., preferably 140 to 155° C. The polyester resin is preferably a copolyester resin of recurring ethylene terephthalate or butylene terephthalate monomers. Alternatively, it may be a copolyester resin consisting of at least two of the ethylene or butylene terephthalate monomers, or a double layered polyester resin consisting of a laminate of at least two of the afore-mentioned resins.

The method of producing the present invention entails contacting the polyester resin to a metal sheet, heating the composite to a temperature above the melting temperature of the polyester resin, and pinching and pressing the composite into a laminate with a pair of laminating rolls. The laminating rolls form a nip at the exit site of the laminate, said nip being equipped to cool the emerging laminate at a rate of at least 600° C./second. The resulting laminate exhibits a true stress of 3.0 to 15.0 kg/mm$^2$ measured at 75° C. and corresponding to a true strain of 1.0.

The resin contemplated for use in the present invention consists of a polyester resin, preferably polyethylene terephthalate, having a low crystallization temperature ranging from 130 to 165° C., optimally between 140 to 155° C. Alternatively, the resin may constitute a copolymer of ethylene terepthalate and ethylene isophthalate monomers. Either formulation, when applied to a metal sheet according to the present invention, results in a laminate of decreased yield strength and increased elongation, thereby reducing occurrences of film peeling, cracking, or fracture.

DETAILED DESCRIPTION OF THE INVENTION

The present invention relates to the coating of metal sheets with a polyester resin film, preferably polyethylene terephthalate (PET), biaxially oriented along its length and width, and having a low crystallization temperature ranging from 130 to 165° C., optimally between 140 and 155° C. This latter value will be explained subsequently.

When an amorphous polyester resin, such as PET, is obtained by heating said resin above its melting temperature, immediately quenching the resin, and then gradually heating with a differential scanning calorimeter (DSC). This process generates an exothermic peak between temperatures of 100 and 200° C., depending upon the resin composition. Resins with exothermic peaks at higher temperatures exhibit lower crystallization velocities compared with those characterized by lower-temperature exothermic peaks. For example, polybutylene terephthalate resins produce an exothermic peak at about 50° C., whereas PET generates a peak at about 128° C. In contrast, an ethylene terephthalate -ethylene isophthalate copolyester resin (typically used in "2-part" cans) exhibits an exothermic peak at about 177° C.

According to the present invention, a biaxially oriented film of PET resin having a low crystallization temperature outside the 130 to 165° C. range can be heat bonded to a metal sheet. However, a PET resin exhibiting a crystallization temperature between 130 and 165° C. is better suited to produce a metal-resin laminate that retains the biaxial orientation of the resin, as well as impermability and impact resistance.

Any resin films of PET, polybutylene terephthalate, ethylene terephthalate copolyesters, ethylene isophthalate copolyesters, blended polyesters of two or more of the preceding components, or multilayers of these resins are applicable to the present invention. Where superior impact resistance is required, a bis-phenol A polycarbonate resin may be added to the polyester resin. Alternatively, the bis-phenol A polycarbonate resin or the bis-phenol A polycarbonate resin in combination with the aforementioned resins of the present invention, may be incorporated into the center of into a multilayer resin, the outermost layers consisting of the aforementioned resins of the present invention. Colored resins may be produced by adding pigments to the molten resin during its manufacture.

The thickness of the polyester resin film ranges between 5 and 50 $\mu$m, preferably 10 to 30 $\mu$m. Thinner films tend to wrinkle and fail to provide uniform coverage of the metal sheet. Films exceeding thicknesses of 50 $\mu$m are unnecessary and economically inefficient.

It is essential to the present invention that the resin employed therein has a true stress of 3.0 to 15.0 kg/mm$^2$ at 75° C., corresponding to a true strain of 1.0. Metal sheets covered with such polyesters withstand "severe forming" methods such as drawing, drawing and ironing, drawing and stretch forming, and ironing after drawing and stretch forming. These drawing methods are carried out at temperatures exceeding the glass transition temperature of the polyester resin, enhancing the formability thereof. The precise technique for heat bonding a polyester resin film to a metal sheet will be described subsequently.

The true strain and true stress of the disclosed polyester resins are measured according to the following procedure:

A resin covered metal sheet is immersed in hydrochloric acid solution, dissolving the metal sheet so that only the polyester resin film remains. A test piece of this film, measuring approximately 5 mm in width and 50–60 mm in length, is subjected to a tensile tester at a temperature of 75° C. A cross head distance of 20 mm is maintained. From these parameters, the nominal stress, $\sigma_0$, and the elongation of the resin, E1, are calculated according to the following formula:

$$E1 = 100 \times (L-L0)$$

wherein
L0: the length of a test piece before stressing
L: the length of a test piece after stressing true strain, $\epsilon a$ and true stress $\sigma a$, are calculated as follows:

$$\epsilon a = \epsilon/(1+\epsilon)$$
$$\sigma a = \sigma_0/(1+\epsilon)$$

wherein
$\epsilon$: strain
$\epsilon$: E1/100.

The value of true stress, corresponding to the true strain of 1.0, may be obtained from the graph of the true strain-true stress curve.

The resin of the present invention preferably exhibits a true stress value between 3.0 and 15.0 kg/mm$^2$. Resins with lesser true stress values produce uneven coverage of metal sheets, due to the large coefficient of friction that develops between the resin and the laminating machinery. Additionally, these resins lack the impermeability to insulate the metal from corrosion. Resins characterized by a true stress value in excess of 15.0 kg/mm$^2$ tend to crack extensively during lamination, again resulting in uneven coverage of the metal sheet.

In cases where there the resin does not sufficiently adhere to the metal sheet, or where single-ply lamination fails to provide adequate corrosion protection and impact resistance, a thermosetting adhesive (e.g., phenol-epoxy adhesive) is coated on a surface of the metal sheet and dried. Alternatively, the polyester resin film, prior to lamination, may be coated with the thermosetting adhesive. Application of the adhesive, however, often proves expensive, and the solvents used therefor are often detrimental to the environment. It is preferred, then, that the additional step of coating the resin or metal with adhesive be avoided whenever possible.

The metal sheets contemplated by the present invention include surface treated strips or sheets of steel or aluminum alloy. If steel is used, low carbon, tin-free steel, having a thickness between 0.15 and 0.30 mm, is preferred. A two layered coating of metallic chromium (bottom layer) and hydrated chromium oxide (upper layer) is applied to the steel sheet to facilitate subsequent adhesion of the polyester resin. The chromium-chromium oxide coating may also be applied to steel sheets plated with tin, nickel or aluminum, a double layered plating or alloy plating of more than one of tin, nickel or aluminum.

If aluminum alloy is used as the metal sheet in the present invention, the JIS 3000 or 5000 series are preferred because of their economy and formability. It is also preferred that the aluminum sheets be subjected to conventional surface treatments, such as electrolysis, dipping in chromic acid solution, etching in alkaline or acidic solution, or anodic oxidation.

As with the steel sheets, it is also possible to apply a dual-layer, chromium-chromium oxide coating to the surface of the aluminum sheets. In either case, the coating weight of the hydrated chromium oxide is preferably between 3 and 50 mg/m$^2$, (inclusive) chromium, optimally between 7 and 25 mg/m$^2$ (inclusive). The coating weight of the metallic chromium layer ranges from 10 to 200 mg/m$^2$, preferably 30 to 100 mg/m$^2$.

Once the metal sheet has been prepared and coated, the polyester resin film is applied according to the following procedure:

1. A continuous supply of metal is heated to a temperature exceeding the melting point of the polyester resin;
2. A continuous supply of biaxially oriented polyester resin film is contacted with the heated metal strip. The resin film may be applied to one or both sides of the metal strip. Optionally, a thermosetting resin (e.g., epoxy resin) can be inserted between the metal sheet and the resin film;
3. The resin film and heated metal strip are then pressed between two laminating rolls forming a nip at the exit site thereof;
4. The laminating rolls pinch and press the film and the metal strip to ensure adhesion;
5. The resin-metal laminate is then cooled at a rate of 600° C./second as it emerges from the nips of the laminating rolls.

In the above process, the heated metal sheets conduct sufficient heat to melt the polyester resin film thereto. The resin loses a greater degree of biaxial orientation nearer its point of contact with the heated metal strip. Biaxial orientation is retained to a greater degree nearer the uppermost surface of the film, farthest from the heated metal strip and closest to the cooling action of the nips of the laminating rolls. Retention of the resin film's biaxial orientation subsequent to lamination is maximized by controlling the cooling rate of the laminate immediately following lamination. The cooling rate is determined by the temperature of the heated metal strip and the laminating rolls, by the size of contact area between the resin-metal sheet composite and the laminating roll, and by the duration of contact between the metal strips and the laminating rolls. The latter value corresponds with the feed rate of the metal strip and laminating rolls. Generally, greater losses of biaxial orientation occur when the resin film is subjected to excessive heat, such as when the metal strip and laminating rolls reach high temperatures or when the feed rate of the metal strip is relatively rapid and the nip length (determined by the diameter of the laminating roll and the elasticity modulus of the roll) is relatively short.

Optimal retention of desired biaxial orientation, wherein when the resin loses a greater degree of biaxial orientation nearer its point of contact with the heated metal strip and retains a greater degree of said orientation nearer the uppermost surface of the film, farthest from the heated metal strip and closest to the cooling action of the nips of the laminating rolls, is achieved by controlling the rate at which the laminate is cooled as it emerges from the nips of the laminating rolls. A cooling rate of 600° C./second appears to result in maximal retention of the resin film's biaxial orientation. Slower cooling rates do not prevent excessive heating of the resin, resulting in greater loss of orientation. This enhances formability, but reduces impact resistance when the laminate is heated subsequent to forming.

PREFERRED EMBODIMENT OF THE PRESENT INVENTION

The following example helps further illustrate the preferred embodiments of the present invention:

A continuously supplied strip of TFS, having a two layer coating of 110 mg/m2 metallic chromium and 14 mg/m2 chromium in the form of chromium hydroxide and possessing a thickness of 0.18 mm and a temper of DR-10, was heated by heating rolls to the temperatures shown in Table 1. A continuous sheet of polyester resin film, from film supplying rolls, was then contacted with each side of the heated metal sheet. The films and the metal sheet were then laminated, pinched and bonded together between laminating rolls maintained at the temperatures shown in Table 1. Immediately thereafter, as the laminate emerged from the nips of the laminating rolls, said laminate was quenched at the temperatures shown in Table 1. The cooling rate was adjusted by altering the nip length, as determined by the diameters of the laminating rolls.

The biaxially oriented resin films contemplated for use in the above example include the following:

1. PET films possessing a thickness of 25 μm and exhibiting the low crystallization temperatures disclosed in Table 1; or
2. Copolyester resins consisting of 88 mol % of ethylene terephthalate and 12 mol % ethylene isophthalate (hereinafter PETI), and possessing a thickness of 25 μm and exhibiting the low crystallization temperatures disclosed in Table 1; or
3. Blended resins with a ratio of 1 part, by weight, polyethylene terephthalate resin to 0.6 parts, by weight, polybutylene terephthalate resin (hereinafter PET+PBT), possessing a total thickness of 25 μm (20 μm lower layer film, 5 μm upper layer film), and manufactured from a blended copolyester resin composed of a lower layer of 94 mol % ethylene terephthalate and 6 mol % ethylene isophthalate and polybutylene terephthalate resin (at a ratio, by weight, of 0.8:1), and an upper layer of 88 mol % ethylene terephthalate and 12 mol % ethylene isophthalate (hereinafter PES/PETI), and exhibiting the low crystallization temperatures disclosed in Table 1.

Various polyester resin films were isolated by exposing the resin-metal laminate to hydrochloric acid solution. Once the TFS substratum was dissolved, the resin was divided into 5 mm×60 mm test pieces. These were subjected to a tensile tester at 75° C. at a cross head distance of 20 mm and a stress rate of 200 mm/minute, and the data used to determine the nominal stress-elongation curves, the true stress-true strain curves, and the true stress values corresponding to a true strain of 1.0 at 75° C.

The above-disclosed resin-covered metal sheets were further processed according to the procedure described below.

The resin-metal laminates were punched out into circular blanks 160 mm in diameter and formed into drawn cans 100 mm in diameter. These cans were then redrawn into cans having a diameter of 80 mm. The 80 mm cans were then simultaneously drawn and stretch formed and ironed to produce cans 66 mm in diameter. The upper edges of the cans were then trimmed, and necks and flanges formed, according to conventional methods.

The following parameters were maintained during the formation of the drawn cans:

1. The clearance between the drawing portion (corresponding to the upper edge of the can) and the ironing portion was 20 mm;
2. The corner curvature radius in a redrawing die was 1.5 times the thickness of the resin-covered metal sheet;
3. The clearance between the redrawing dies and the punch was equal to the thickness of the resin-covered metal sheet; and
4. The clearance between the ironing portion of the redrawing dies and the punch was half the thickness of the resin-covered metal sheet.

Once the resin-covered metal sheets were formed into cans, both impact resistance and the resin's tendency to peel away from the metal sheet were evaluated as described below and in Table 2. All evaluations were made upon cans possessing true stresses corresponding to true strains of 1.0 at 75° C.

1. Resin's Tendency to Peel

The degree to which the inner and outer resin layers peeled away from the metal sheet were observed b the naked eye and evaluated using the following key:

⊚: no peeling-off

○: slightly peeled off but no problem for practical use

Δ: heavily peeled off

X : peeled off at the whole upper portion of the can body

2. Impact Resistance of the Resin Film Inside the Body of the Can

To measure the impact resistance of the interior resin, the can was filled with water, corked, and dropped from a height of 15 cm. The can was then opened and the water removed. The can was then packed with a 3% solution of NaCl, and a stainless steel cathode rod inserted therein. Approximately 6.3 volts was then applied between the cathode and the can body (which served as an anode). Impact resistance was determined from the value of the current, in mA, running therethrough.

As indicated in Table 2, resin-covered metal sheets possessing true stresses between 3.0 and 15.0 kg/mm², corresponding to a true strain of 1.0 at 75° C., exhibit excellent adhesion and impact resistance.

TABLE 1

Characteristics of polyester resins and laminating conditions

| | Resin film | | Covering conditions of resin film | | |
|---|---|---|---|---|---|
| Sample Number | Resin composition | L.T.C.* temperature (° C.) | Heating temperature of metal sheet (° C.) | Temperature of laminating rolls (° C.) | Cooling rate after lamination (° C./sec) |
| 1 | PET | 128 | 310 | 150 | 587 |
| 2 | PET | 128 | 280 | 150 | 637 |
| 3 | PET | 128 | 270 | 150 | 650 |
| 4 | PET | 128 | 280 | 150 | 637 |
| 5 | PET | 128 | 290 | 150 | 619 |
| 6 | PET | 128 | 300 | 150 | 603 |
| 7 | PET | 128 | 310 | 150 | 587 |
| 8 | PET | 130 | 290 | 150 | 619 |
| 9 | PET | 140 | 270 | 150 | 650 |
| 10 | PET | 140 | 280 | 150 | 637 |
| 11 | PET | 140 | 290 | 150 | 619 |
| 12 | PET | 140 | 300 | 150 | 603 |
| 13 | PET | 140 | 310 | 150 | 587 |
| 14 | PET | 155 | 270 | 150 | 650 |
| 15 | PET | 155 | 280 | 150 | 637 |
| 16 | PET | 155 | 290 | 150 | 619 |
| 17 | PET | 155 | 300 | 150 | 603 |
| 18 | PET | 155 | 310 | 150 | 587 |
| 19 | PET | 165 | 290 | 150 | 619 |
| 20 | PETI | 177 | 245 | 120 | 655 |
| 21 | PET + PBT | 140 | 290 | 150 | 619 |
| 22 | PES/PETI | 140 | 300 | 150 | 603 |

*L.T.C. (Low Temperature Crystallization)

TABLE 2

Evaluation result of properties of resin covered metal sheet

| | True stress corresponding | Evaluation of covered metal sheet | | |
|---|---|---|---|---|
| Sample Number | to true strain of 1.0 measured at 75° C. (kg/mm²) | Peeling-off of film (by naked eye) | Impact resistance (mA) | Item |
| 1 | 2.1 | ⊚ | 0.95 | Comp. Ex.# |
| 2 | 13.9 | ○ | 0.01 | Example |
| 3 | 17.2 | X | unmeasured | Comp. Ex.# |
| 4 | 14.7 | ○ | 0.00 | Example |
| 5 | 10.2 | ○ | 0.00 | Example |
| 6 | 3.4 | ⊚ | 0.09 | Example |
| 7 | 2.3 | ⊚ | 0.85 | Comp. Ex.# |
| 8 | 9.3 | ⊚ | 0.00 | Example |
| 9 | 16.5 | Δ | 0.00 | Comp. Ex.# |
| 10 | 14.3 | ○ | 0.00 | Example |
| 11 | 9.1 | ⊚ | 0.00 | Example |
| 12 | 3.4 | ⊚ | 0.08 | Example |
| 13 | 2.6 | ⊚ | 0.53 | Comp. Ex.# |
| 14 | 16.8 | Δ | 0.00 | Comp. Ex.# |
| 15 | 14.4 | ⊚ | 0.00 | Example |
| 16 | 9.4 | ⊚ | 0.00 | Example |
| 17 | 3.3 | ⊚ | 0.09 | Example |
| 18 | 2.1 | ⊚ | 0.49 | Comp. Ex.# |
| 19 | 8.9 | ⊚ | 0.00 | Example |
| 20 | 14.7 | ⊚ | 0.00 | Example |
| 21 | 11.3 | ⊚ | 0.01 | Example |
| 22 | 7.5 | ⊚ | 0.00 | Example |

Remarks: Comp. Ex.# (Comparative Example)

The foregoing description of the specific embodiments will so fully reveal the general nature of the invention that others can, by applying current knowledge, readily modify and/or adapt for various applications such specific embodiments without undue experimentation and without departing from the generic concept. Therefore, such adaptations and modifications should and are intended to be comprehended within the meaning and range of equivalents of the disclosed embodiments. It is to be understood that the phraseology or terminology employed herein is for the purpose of description and not of limitation. The mans and materials for carrying our various disclosed functions may take a variety of alternative forms without departing from the invention. Thus, the expressions "means to . . . " and "means for . . . " as may be found in the specification above and/or in the claims below, followed by a functional statement, are intended to define and cover whatever structural, physical, chemical, or electrical element or structures which may now or in the future exist for carrying out the recited function, whether or not precisely equivalent to the embodiment or embodiments disclosed in the specification above; and it is intended that such expressions be given their broadest interpretation.

What is claimed is:

1. A polyester resin film covered metal sheet for a can produced by ironing after drawing and stretch forming exhibiting a true stress of 3.0 to 15.0 kg/mm², corresponding to a true strain oa 1.0 at 75° C., wherein the polyester film retains its biaxial orientation subsequent to lamination and wherein the polyester resin has a low temperature crystallization of 130 to 165° C. and wherein the low temperature crystallization value is obtained from the temperature of the exothermic peak produced upon heating a quenched sample of the resin in a differential scanning calorimeter.

2. A polyester resin film wherein the mechanical characteristics of said film are measured from a test piece of post-lamination polyester resin film obtained by chemically dissolving the metal sheet layer from a preformed laminate produced according to claim 1.

3. The polyester resin covered metal sheet for a can produced by ironing after drawing and stretch forming according to claim 1, wherein the polyester resin is polyethylene terephthalate (PET) resin.

4. The polyester resin covered metal sheet for a can produced by ironing after drawing and stretch forming according to claim 3, wherein said PET resin has a low temperature crystallization of 140 to 155° C. and wherein the low temperature crystallization value is obtained from temperature of the exothermic peak produced upon heating a quenched sample of the resin in a differential scanning calorimeter.

5. The polyester resin covered metal sheet for a can produced by ironing after drawing and stretch forming according to claim 1, wherein the polyester resin is selected from the group consisting of:

copolyester resins comprised of recurring ethylene terephthalate units;

copolyester resins comprised of recurring butylene terephthalate units;

copolyester resins comprised of at least two of these resins; and double-layered polyester resins comprised of a laminate of at least two of these resins.

6. A method of producing a polyester resin covered metal sheet for a can produced by ironing after drawing and stretch forming according to claim 1, wherein the metal sheet is heated to a temperature exceeding the melting point of the resin, the resin is contacted with the metal sheet, the resin and metal sheet are pinched and pressed into a laminate by a pair of laminating rolls, and the resulting resin-covered metal sheet is immediately cooled at a cooling rate of at least 600° C./second by a nip formed by the laminating rolls.

7. The polyester resin film covered metal sheet for a can produced by ironing after drawing and stretch forming according to claim 6, wherein the polyester resin is polyethylene terephthalate (PET) resin.

8. The polyester resin covered metal sheet for a can produced by ironing after drawing and stretch forming according to claim 7, wherein said PET resin has a low temperature crystallization of 140 to 155° C. and wherein the low temperature crystallization value is obtained from temperature of the exothermic peak produced upon heating a quenched sample of the resin in a differential scanning calorimeter.

9. The polyester resin covered metal sheet according to claim 6, wherein the polyester resin is selected from the group consisting of:

copolyester resins comprised of recurring ethylene terephthalate units;

copolyester resins comprised of recurring butylene terephthalate units;

copolyester resins comprised of at least two of these resins; and double-layered polyester resins comprised of a laminate of at least two of these resins.

* * * * *